United States Patent [19]

Naudin

[11] Patent Number: 4,854,029
[45] Date of Patent: Aug. 8, 1989

[54] METHOD OF FIXING A PART FOR TRANSMITTING TORQUE TO A PLATE OF A CLUTCH

[75] Inventor: Jacky Naudin, Ermont, France

[73] Assignee: Valeo, Paris, France

[21] Appl. No.: 262,782

[22] Filed: Oct. 26, 1988

[30] Foreign Application Priority Data

Oct. 28, 1987 [FR] France .................. 87,14901

[51] Int. Cl.$^4$ .................. B23P 25/00; B21D 35/00
[52] U.S. Cl. .................. 29/458; 29/469.5; 29/524.1; 29/525.1; 156/91; 192/70.18
[58] Field of Search .......... 29/524.1, 526, 525.1, 29/458, 469.5; 192/70.18, DIG. 89 B; 156/91, 295

[56] References Cited

U.S. PATENT DOCUMENTS

| | | | |
|---|---|---|---|
| 2,753,624 | 7/1956 | Taylor | 29/524.1 |
| 3,702,085 | 11/1972 | Hicok | 29/524.1 X |
| 3,964,948 | 6/1976 | Busse | 156/91 |
| 4,224,971 | 9/1980 | Berger et al. | 156/91 X |
| 4,482,415 | 11/1984 | Mart et al. | 156/91 |
| 4,567,974 | 2/1986 | Birk | 192/70.18 |
| 4,615,424 | 10/1986 | Kohler | 192/70.18 |
| 4,635,775 | 1/1987 | Kohler | 192/70.18 |
| 4,763,396 | 8/1988 | Fischer | 29/469.5 X |

FOREIGN PATENT DOCUMENTS

| | | |
|---|---|---|
| 3336158 | 4/1985 | Fed. Rep. of Germany . |
| 3422019 | 12/1985 | Fed. Rep. of Germany ... 192/70.18 |
| 3600972 | 7/1987 | Fed. Rep. of Germany . |
| 1576586 | 8/1969 | France . |
| 2529489 | 1/1984 | France . |
| 2554893 | 5/1985 | France . |
| 2571461 | 4/1986 | France . |
| 2580350 | 10/1986 | France . |
| 2156014 | 10/1985 | United Kingdom . |
| 2176549 | 12/1986 | United Kingdom ............. 192/70.18 |

Primary Examiner—Charlie T. Moon
Attorney, Agent, or Firm—Charles E. Brown; Charles A. Brown

[57] ABSTRACT

In a clutch suitable for an automobile vehicle, a method of fixing at least one torque transmitting part of the clutch to a clutch plate by means of fixing elements adapted to pass trough an opening in the said part and to engage in a blind hole in the said plate, in which the fixing element consists of a stud, adhesive is deposited in the blind hole and/or on the stud, the stud is inserted with a slight play in the blind hole after passing through the opening in the part, and the projecting end of the stud is permanently deformed by means of a tool which spreads the stud to clamp the part.

4 Claims, 4 Drawing Sheets

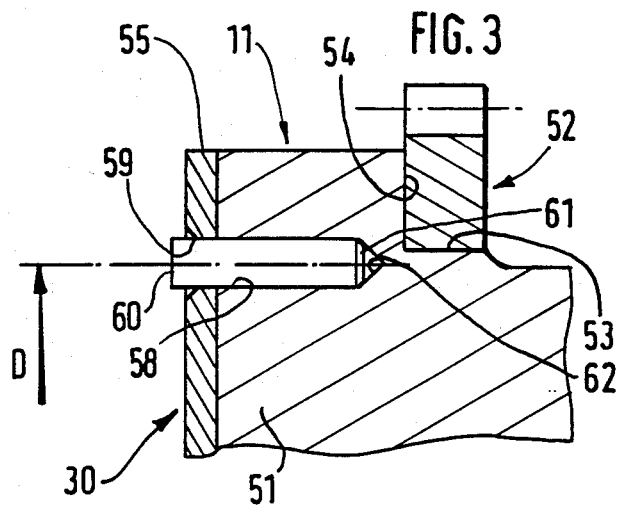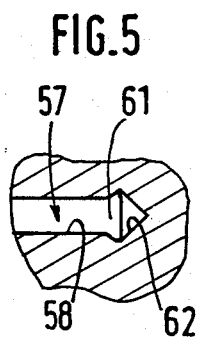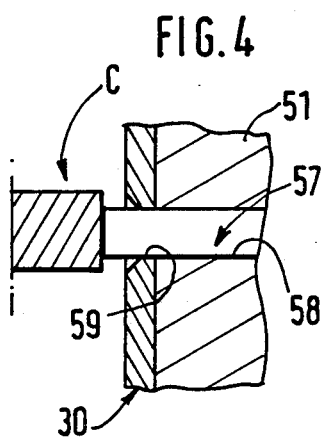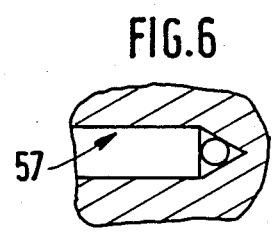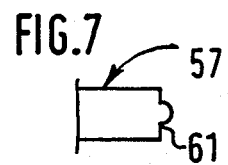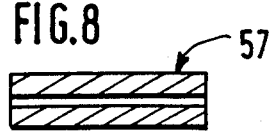

METHOD OF FIXING A PART FOR TRANSMITTING TORQUE TO A PLATE OF A CLUTCH

FIELD OF THE INVENTION

The present invention relates to clutches, particularly for automobile vehicles, of the kind comprising a plate and at least one part for transmitting torque fixed to the plate by fixing elements each adapted to pass through an opening in the said part and to engage in a blind hole in the plate. It relates more particularly to a method of fixing the part to the plate and to its applications.

BACKGROUND OF THE INVENTION

A clutch of this kind is described for example in the documents FR-A-No. 2 554 893, FR-A-No. 1 576 586 and DE-A-No. 36 00 972.

As is well known, a clutch generally comprises a reaction plate, and a clutch mechanism fixed to the reaction plate to clamp at least one friction disc therebetween. The mechanism comprises, overall, a cover and at least one pressure plate connected in rotation to the cover through the intermediary of tongues.

As described in the document FR-A-No. 2 554 893, the reaction plate may form part of a double damped flywheel and may be movable relative to an inertia plate, against the action of elastic means bearing on a flange fixed to the inertia plate.

In all cases the cover, the tongues or the flange form part for transmitting torque fixed respectively to the reaction plate, to the cover and to the pressure plate, or to the inertia plate, by fixing elements.

In these documents, the fixing elements consist of screws, or rivets provided with a head. In the arrangement with screws, the length of the blind hole does not need to be exact and the manufacturing tolerances of the part for transmitting the torque do not need to be precise. The disadvantage of this arrangement is the necessity to tap the blind hole, and the risk of the screws loosening, particularly as a result of vibrations.

In the arrangement with rivets having a shouldered head, the length of the blind hole must be exact as must that of the rivet. Moreover, it is also necessary to take into account the manufacturing tolerances of the part for transmitting the torque, and the clamping of this is influenced by the elastic rebound of the head of the rivet when the tool is withdrawn. In addition, when the mechanical forces involved are large, it is necessary to make grooves in the blind hole.

The object of the present invention is to overcome these disadvantages whilst enabling transmission of a large torque in a lasting manner, without the need for additional machine processing in the blind hole and whilst providing other advantages.

SUMMARY OF THE INVENTION

In accordance with the invention, the method of fixing at least one part for transmitting torque to a plate in a clutch is characterised in that the fixing element consists of a stud, and a blind hole is formed in the plate for receiving the stud, adhesive is deposited in the blind hole and/or on the stud, the stud is inserted with a slight play in the blind hole, the stud passing through an opening in the said part, and the projecting end of the stud is permanently deformed by means of a tool which spreads it to clamp the said part.

The axial compactness, the simplicity, and the reduced number of parts of this arrangement will be appreciated. These, on the one hand, enable a solid fixing, free from play, of the stud in the plate without risk of cracks appearing and, on the other hand, enable good filling of the opening by the stud and good clamping of the part for transmitting torque, so that it is possible to transmit a large torque. The stud may be obtained economically by cutting off sections from a smooth cylindrical bar.

The blind hole may also be smooth. Preferably the stud is deformed before the adhesive sets. As a result of this measure, the stud is caused to enlarge and the adhesive is well distributed to guarantee a solid connection without play between the stud and the blind hole.

The great flexibility of this method will be appreciated which enables, before deformation of the projecting part of the stud, either for the stud to be first fixed to the plate then the part to be engaged on the stud, optionally after the adhesive has set, or the stud to be simultaneously engaged in the opening in the part and in the blind hole.

With a double flywheel, this method provides the possibility of radial fixing at the level of the inner diameter of the starting ring.

It will be appreciated that the manufacturing tolerances of the blind hole, the part for transmitting torque, and the stud, respectively, do not need to be exact.

As a result of the invention, it is possible to provide the part for transmitting torque with openings which are at least partially countersunk and which have a uniform contact between the countersunk opening and the stud by plastic flow of the material of the (optionally) countersunk projecting end of the stud. The axial bulk is thus reduced, which, especially in the case of a double damped flywheel, avoids the need to recess the reaction plate. In addition, a better deformation of the stud in the blind hole is obtained.

Admittedly, in order to reduce axial bulk, the use of countersunk screws each engaged in a countersunk opening in the part for transmitting the torque could be proposed but, taking into account the tolerances in the position of the tapped holes in the plate and of the countersunk openings in the said part, the heads of the screws would be in contact only with a generatrix of the corresponding countersunk opening. Consequently the clamping by the screws would not be maintained with time, especially because of the vibrations which generate the phenomena of caulking.

The invention will be better understood in the light of the following description with reference to the attached drawings which are given by way of example.

BRIEF DESCRIPTION OF THE DRAWINGS

FIG. 3 is a partial view of details in radial section before flattening of the end of the stud;

FIG. 4 is a partial view in radial section showing the fastening tool;

FIG. 5 is a partial view in radial section showing the enlargement of the head of the stud;

FIG. 6 is a partial view in radial section showing the bottom of the blind hole as well as the ball for enlarging the head of the stud;

FIG. 7 is a view showing the rounded end of the stud;

FIG. 8 is a view in section showing a hollow stud;

DESCRIPTION OF THE PREFERRED EMBODIMENTS

Figure 1:
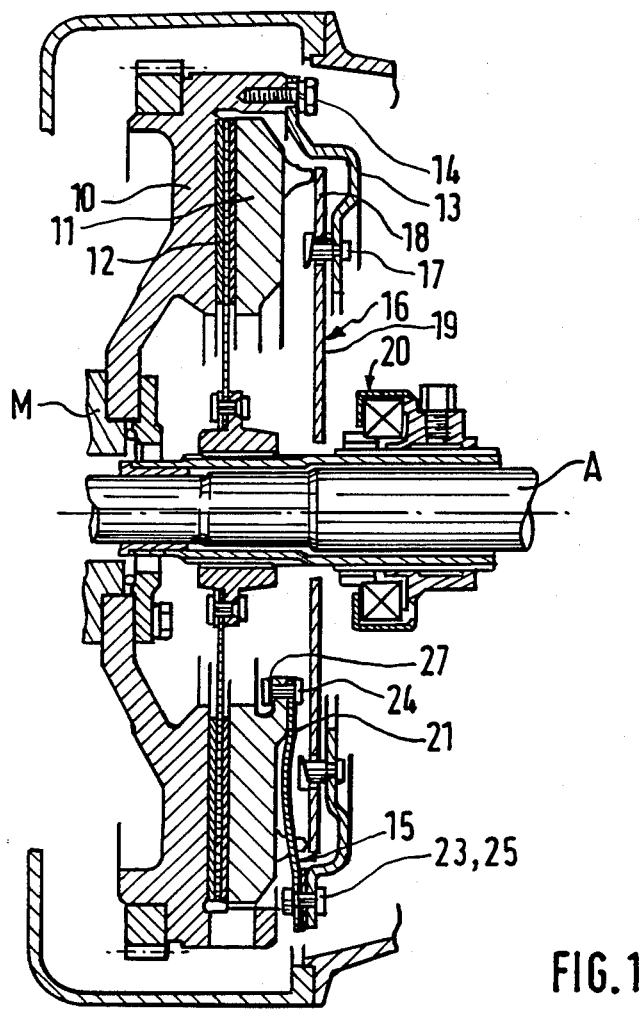
FIG. 1 is a view in radial section of a prior art clutch.

FIG. 1 shows a clutch as described in patent FR-A-No. 1 576 586.

This clutch comprises a reaction plate 10 integral in rotation with the engine crankshaft M and a clutch mechanism 10, 15, 16, 17 and 13. This mechanism comprises at least one pressure plate 11 connected in rotation to a cover 13, but movable axially relative to this cover by means of connecting tongues 21. The plate 11 is subjected to the action of elastic means 16, in this case a diaphragm comprising a Belleville washer 18 and radial fingers 19 which, bearing on the cover 13, urge the pressure plate 11 toward the reaction plate 10 to clamp a friction disc 12, connected in rotation to the input shaft A of the gearbox, between them.

The mechanism is adapted to be connected to the reaction plate 10 at its cover 13 and by means of fixing elements 14.

The tongues 21 constitute parts for transmitting torque, in the same way as the cover 13, and are fixed to the pressure plate 11 and to the cover 13 by fixing elements 23, 24, 25. The diaphragm 16 is mounted to pivot on the cover 13 by means of small columns 17 and a clutch release bearing 20 is provided to act on the fingers 19 to operate the clutch.

Figure 2:
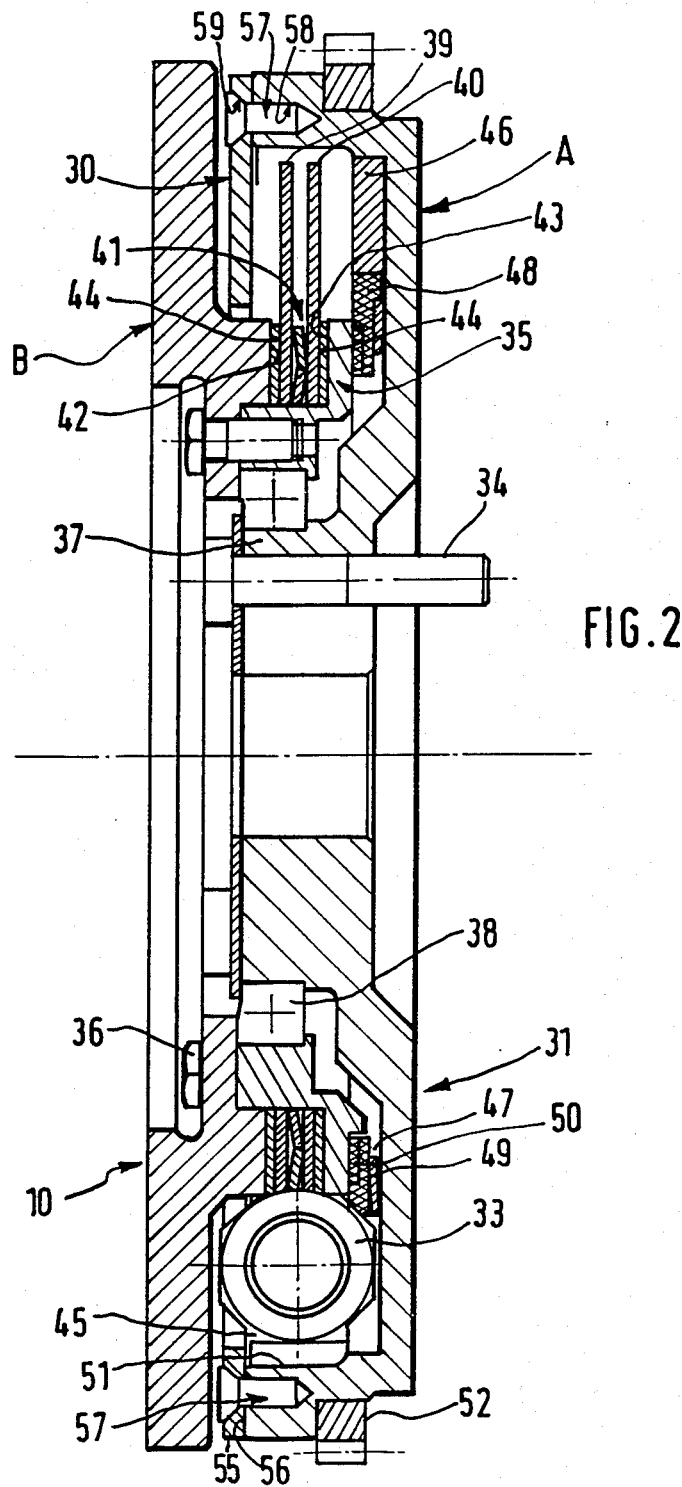
FIG. 2 is a view in radial section of a first application of the invention to a double damped flywheel.

FIG. 2 shows a double damped flywheel comprising two coaxial rotating parts A, B, mounted to move relative to one another within predetermined limits of angular movement 33. against the action of circumferentially acting elastic means One of the parts comprises an inertia plate 31, integral in rotation with the nose of the engine crankshaft through the screw 34, whereas the other comprises a plate 10 forming the reaction plate of the clutch.

The disc 12 in FIG. 1 is thus intended to come into contact with the plate 10, likewise the clutch mechanism is adapted to be mixed to this plate 10 at its cover.

The reaction plate 10 is fixed to a connecting plate 35 having a radial flange 35', by screws 36. A roller bearing 38 is interposed between the plate 35 and a hub 37 in one piece with the plate 31.

The double flywheel comprises a torque limiter centered by the connecting plate 35 and provided with two flanges 39, 40. Belleville springs 41 are interposed between the flanges 39, 40 and urge these flanges towards the radial bearings 42, 43 forming part of the connecting plate 35 and the reaction plate 10 respectively, with the interposition of a friction lining 44 between the said flanges 39, 40 and the said bearings 42, 43. The flanges comprise arms with fingers adapted to cooperate with recesses of the seatings 45 as described in patent FR-A-No. 2 571 461.

The elastic means 33, which in this case are helicoidal springs, are each disposed between two seatings 45 articulated on the guide washer 30 and having sectors 46 integral with the inertia plate 31, in this case by riveting. Each sector 46 extends between two seatings associated with separate springs 33, in such a way that a guide washer is constituted by these elements.

This arrangement is profitably employed to provide a hysteresis device. In fact it becomes possible to connect the distribution washer 47 in rotation to the sectors 46 with the aid of pegs 48 slidingly engaged in corresponding axial grooves in the sectors 46.

The Belleville washer 49 is centered by the washer 47 to urge the friction washer 50 connected to the washer 47 into contact with the continuous outer face, facing the plate 31, of the flange 35'. The plate 31 has a recessed shape and is provided on the outside with an axial return 51 which carries the starting ring 52. This ring is force fitted onto an axial bearing surface 53 of the return 51 in contact with a radial bearing surface 54 of the latter.

The guide washer 30 has a radial rim 55 suitable to make contact with edge 56 of the return 51 facing the plate 11.

This washer 30, which serves as a bearing for the spring 33 and constitutes a part for transmitting the torque of the clutch, is fixed to the inertia plate 31 by means of at least two fixing elements 57 each engaged in a blind hole 58 in the said plate 31 and each passing through an opening 59 in the part 30.

According to the invention, the fixing element 57 consists of a stud, and during assembly adhesive is deposited in the blind hole 58 and/or on the stud 57, the stud is inserted with a slight play in the blind hole 58, then, the stud passing through the opening 59 in the part 30, the projecting end 60 of the stud 57 is permanently deformed by means of a tool C to spread the end and to clamp the said part 30.

In this case the stud 57 is deformed before the adhesive is set, (before polymerisation) and the stud 57 is simultaneously engaged in the opening 59 and in the hole 58.

In FIG. 3 the stud is shown before deformation of its projecting end 60. Of course, the length of the stud 57 is chosen in relation to the length of the hole 58 and the thickness of the part 30 so that the stud projects relative to the part 30 when applied against the bottom of the hole.

The stud 57, which is cylindrical with a circular transverse section, is rough to improve adhesion, its roughness being obtained by sand blasting for example. It has a flat chamfered head 61 to facilitate its installation. The bottom 62 of the hole 58 is tapered, or of another suitable shape. The hole 58 has a shape complementary to that of the stud 57 and has a smooth cylindrical contour. It is obtained by drilling.

In this case the adhesive is deposited in the hole 58 and in the opening 59, which has a countersunk part 63, before installation of the stud 57. The stud is mounted in the blind hole 58 with a play less than or equal to that with which the stud passes through the main part of the opening 59. With the help of a flat clamping tool C (FIG. 4) the end 60 is plastically deformed in such a way that it fills the countersunk opening 59 by plastic flow and tightly clamps the part 30 in contact with the plate 31.

After this operation the end 60 is expanded radially forming a retaining bearing, and it is thus possible to transmit a significant torque. The head 61 may be flat so that an enlargement, especially a radial enlargement, is produced on it.

In this way, in addition to the expansion of the main part of the stud resulting from the flattening of the projecting end 60, a secure connection is obtained between the head 61 and the blind hole 58, as well as a good distribution of the adhesive and good adhesion.

Spreading of the head 61 may be facilitated by a ball disposed in the bottom of the hole 58 (FIG. 6). This spreading may also be obtained with the help of a rounded part 62 of the head 61, for example in the shape of a ball (FIG. 7).

In order to improve the adhesion and/or the deformation of the stud, the central part of the stud may be hollow (FIG. 8). Since the adhesive is deposited first in the hole 58, this arrangement enables the air bubbles contained in the adhesive to be expelled whilst favouring, on the one hand, the spreading of the head 61 in contact with the bottom of the hole 58 and, on the other hand, the flattening of the projecting end 60 and good filling of the opening 59.

As a result of this method, as can be seen in FIG. 2, it is possible to fix the part 30 radially level with the inner diameter of the starting ring 52, on a median circumference close to that of the inner periphery of the starting ring.

The blind holes 58 are disposed on a median circumference of diameter D slightly less than the diameter of the cylindrical part 53 (FIG. 3). This arrangement makes it possible to fix the part 30, whilst having a good bearing surface 54 for the ring 52, when a conventional arrangement using rivets and a through hole is impossible because of the presence of the ring 52.

As a result of the invention, it is not necessary to indent the reaction plate 10, the axial bulk being reduced because of the countersunk openings 59 in the part 30 for transmitting torque.

Figure 9:
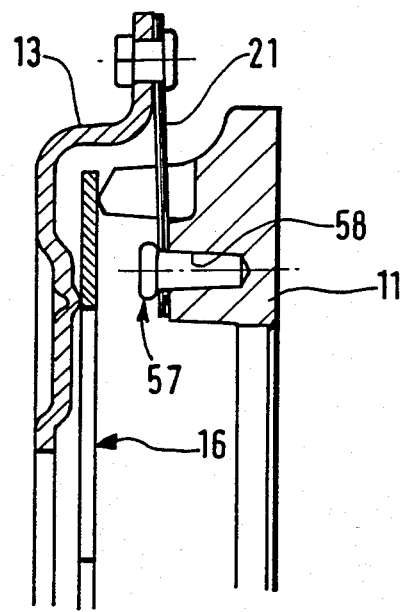
FIG. 9 is a half view in radial section of a second application of the invention to a clutch mechanism.

This method may be used to attach the transversely extending tongues 21 to the pressure plate 11 of the mechanism in FIG. 1, as shown in FIG. 9, by means of studs 57 in accordance with the invention. It will be noted that each stud passes through a plurality of tongues and that the openings in the tongues are not countersunk. Of course, a washer may be engaged on the stud 57 and be inserted between the tongues and the deformed end 60 of the stud 57. It will be noted that the tool has a flat shape.

The arrangement shown in FIG. 2 enables the constructor to examine the inertia plate 31 separately before the double flywheel is assembled. Moreover, it is possible, due to the sectors 46 and the recessed plate 31, to stack the various components and then to attach the guide washer 30 and finally mount the reaction plate 10.

It is also possible to attach the cover to the reaction plate by means of studs in accordance with the method of the present invention. Likewise, the double damped flywheel may be fitted with two guide washers connected to the inertia plate as described in French Patent application No. 87 09 919. In this case, the guide washers may be shaped to come together on the outside of springs through attached radial rims. The fixing studs may then attach several parts for transmitting torque to the clutch plate. In this case the opening in the part attached to the plate is advantageously less than that of the opening in the other part.

It will be appreciated that it is possible to coat the stud with adhesive before its introduction into the blind hole and to connect the part to the plate after the stud is fixed by adhesion. Finally, if necessary, the tool C may be rounded for good contact with the centre of the stud, and to perfect the enlargement of the head 61 and the end 60.

What is claimed is:

1. In a clutch suitable for an automobile vehicle, a method of fixing at least one part for transmitting the torque of the clutch to a clutch plate by means of a fixing element adapted to pass through an opening in said part for transmitting torque and to engage in a blind hole in said plate, comprising providing a stud as the fixing element, depositing adhesive in said blind hole and/or on inserting the stud, the stud with a slight play in the blind hole and against an end wall thereof after passing through the opening in said part, and permanently deforming by means of a tool the projecting end of the stud which spreads said projecting end to clamp said part and radially expands the stud in said behind hole.

2. A method of fixing according to claim 1, wherein the projecting end of the stud is deformed before the adhesive sets.

3. A method according to claim 2, wherein the opening comprises a countersunk part, and the projecting end of the stud is permanently deformed by means of the tool so as to fill the countersunk part by plastic deformation.

4. A method according to claim 3, wherein the stud has a hollow centre and is applied against the bottom of the blind hole, air bubbles contained in the adhesive being expelled on flattening of the projecting end of the stud.

* * * * *